United States Patent
Heinz et al.

(10) Patent No.: US 7,557,544 B2
(45) Date of Patent: Jul. 7, 2009

(54) ZERO CROSSING DETECTION FOR AN ELECTRIC POWER GENERATION SYSTEM

(75) Inventors: John E. Heinz, Plymouth, MN (US); Brian G. Haupt, Stillwater, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 253 days.

(21) Appl. No.: 11/788,924

(22) Filed: Apr. 23, 2007

(65) Prior Publication Data
US 2008/0258692 A1 Oct. 23, 2008

(51) Int. Cl.
H02P 9/44 (2006.01)
G05F 1/10 (2006.01)

(52) U.S. Cl. .............................. 322/20; 322/36; 322/37; 363/45

(58) Field of Classification Search .................... 322/20, 322/22, 23, 29, 36, 37, 99; 363/45, 21
See application file for complete search history.

(56) References Cited

U.S. PATENT DOCUMENTS

| | | |
|---|---|---|
| 4,063,162 A | 12/1977 | Lanz et al. |
| 4,661,769 A | 4/1987 | Girgis |
| 5,029,120 A | 7/1991 | Brodeur et al. |
| 5,315,229 A | 5/1994 | Markus |
| 5,406,495 A | 4/1995 | Hill |
| 5,587,917 A | 12/1996 | Elms |
| 5,773,964 A * | 6/1998 | Peter ............................ 322/20 |
| 5,808,450 A * | 9/1998 | Chula et al. .................... 322/22 |
| 5,841,641 A * | 11/1998 | Faulk ....................... 363/21.14 |
| 5,890,097 A | 3/1999 | Cox |
| 5,909,656 A | 6/1999 | Yang |
| 5,959,852 A * | 9/1999 | Deloy et al. ................... 363/45 |
| 6,037,768 A | 3/2000 | Moulder et al. |
| 6,038,267 A | 3/2000 | Oura et al. |
| 6,173,216 B1 | 1/2001 | Vu et al. |
| 6,670,721 B2 * | 12/2003 | Lof et al. ....................... 290/44 |
| 6,879,053 B1 * | 4/2005 | Welches et al. ................ 290/6 |
| 7,075,254 B2 | 7/2006 | Chitta et al. |
| 7,206,420 B2 | 4/2007 | Bizjak |
| 7,453,242 B2 * | 11/2008 | Ichinose et al. ............... 322/29 |
| 2005/0074665 A1 | 4/2005 | Spaziante et al. |

* cited by examiner

Primary Examiner—Nicholas Ponomarenko
(74) Attorney, Agent, or Firm—J. Bruce Schelkopf; L. Scott Paynter; Krieg DeVault LLP

(57) ABSTRACT

One system of the present application includes an electric power generation device structured to provide an AC electric power output at a target frequency. This device includes: an electric power generator; a sensing arrangement structured to provide samples corresponding to magnitude of the AC electric power output; and a controller including operational logic responsive to the sensing arrangement to calculate a peak amplitude as a function of a waveform period corresponding to the target frequency and two of the samples separated in time by a target duration of 20 to 30 percent of the waveform period and determine a zero crossing of the output from the peak amplitude and the target frequency. The operating logic is further structured to control operation of the device in accordance with the zero crossing.

26 Claims, 3 Drawing Sheets

ZERO CROSSING DETECTION FOR AN ELECTRIC POWER GENERATION SYSTEM

BACKGROUND

The present invention relates to electric power systems, and more particularly, but not exclusively, relates to the control of electric power generation systems.

It is frequently desirable to determine when an electric power output changes polarity or "crosses zero" to regulate associated generation systems. Various zero crossing detection techniques have been utilized. Unfortunately, these schemes are typically susceptible to noise and/or impose an undesirable delay when a rapid change takes place. Thus, there is room for further contributions in this area of technology.

SUMMARY

One embodiment of the present invention includes a unique technique involving electric power generation and/or control. Other embodiments include unique methods, systems, devices, and apparatus involving the generation and/or control of electric power. Further embodiments, forms, features, aspects, benefits, and advantages of the present application shall become apparent from the description and figures provided herewith.

DETAILED DESCRIPTION OF REPRESENTATIVE EMBODIMENTS

Figure 1:
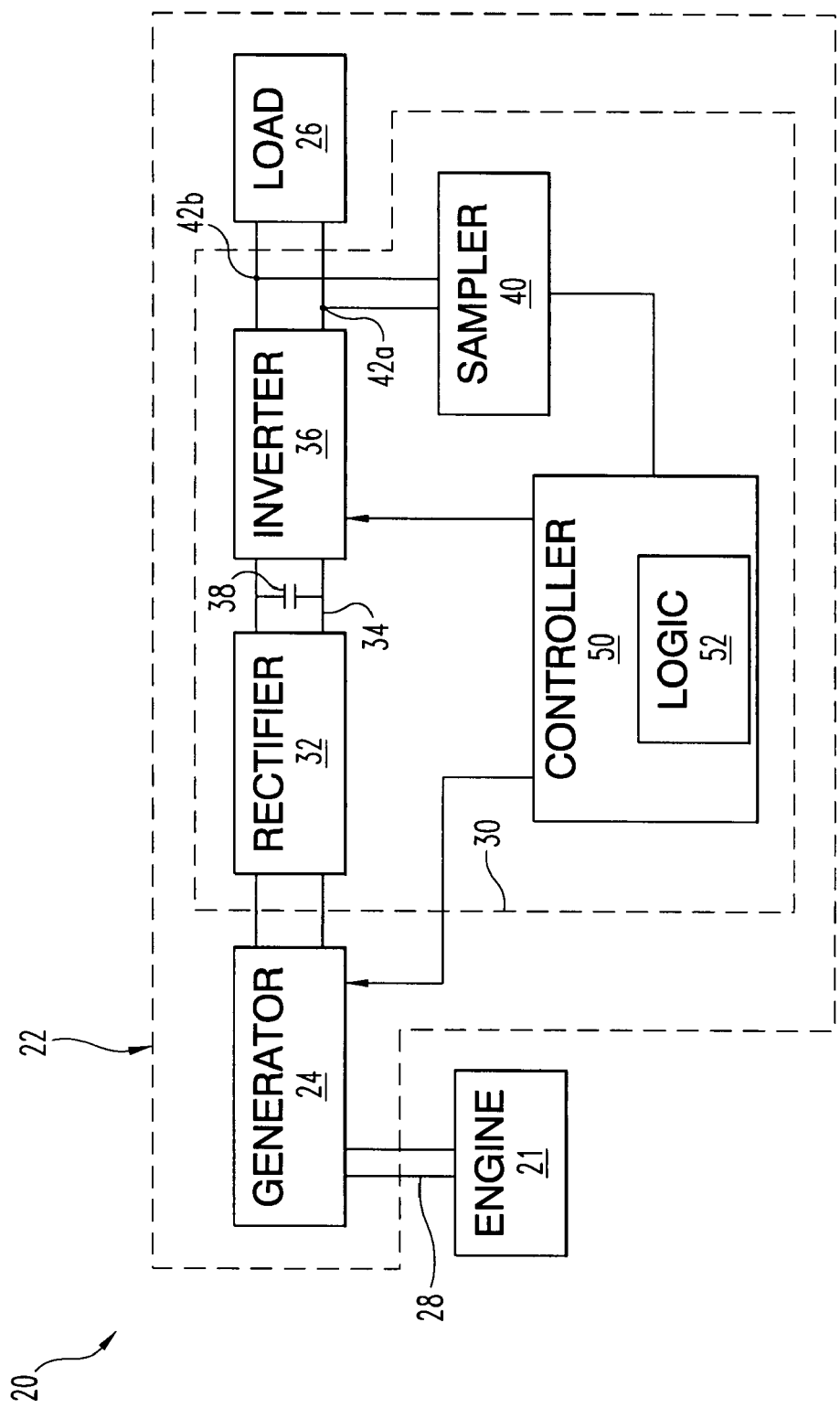
FIG. 1 is a diagrammatic view of an electric power system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

One embodiment of the present application is directed to a technique to predict a predefined magnitude of a point along a sinusoidal AC power waveform with respect to time that can be determined from no more than two samples of the waveform. This technique can be used to calculate zero crossing of the waveform for a target waveform frequency/period—such that the predefined magnitude is zero.

FIG. 1 illustrates another embodiment of the present application in the form of electric power system 20 that makes use of zero crossing information. System 20 comprises a prime mover in the form of an internal combustion engine 21, an electric power generating device 22 in the form of a variable speed generator 24 and converter 30, and an electric load 26 that is powered by device 22. Engine 21 provides rotational mechanical energy to generator 24 with a rotary drive member 28. In one embodiment, engine 21 is of a reciprocating piston type and member 28 is a drive shaft of engine 21. In other embodiments, member 28 may include mechanical linkage that provides a desired turn ratio, a torque converter, a transmission, and/or a different form of rotary linking mechanism as would occur to those skilled in the art. Operation of engine 21 is regulated via an engine control module (ECM) (not shown).

In one embodiment, generator 24 is of a permanent magnet alternator (PMA) type. Generator 24 converts the rotational mechanical energy provided by engine 21 via member 28 to alternating current (AC) electric power that varies in frequency as the rate of rotation of generator 24 varies. Load 26 can vary dynamically in terms of the power it requires and its reactivity. The rotational speeds of engine 21 and generator 24 increase to meet larger power demands corresponding to increases in load 26. Engine 21 and generator 24 have a steady state minimum speed at the lower extreme of the operating range that corresponds to a low power output, and a steady state maximum speed at the upper extreme of the operating range that corresponds to a high power output. As the speed of engine 21 and correspondingly generator 24 vary, the AC electrical power output from generator 24 varies in terms of frequency and voltage.

Converter 30 is electrically coupled between generator 24 and load 26. Converter 30 transforms the variable frequency AC electric power output of generator 24 to an AC electric power output that is provided to load 26. Converter 30 regulates this output to a predefined target frequency and sinusoidal AC voltage that are approximately fixed under steady state operating conditions compared to the variable frequency/voltage AC input from generator 24. Converter 30 includes an AC to direct current (DC) rectifier 32, a DC bus 34, a controllable DC to AC inverter 36, a sampler arrangement 40, and a controller 50. Rectifier 32 converts the variable AC electric power output from generator 24 to DC electric power on DC bus 34. Rectifier 32 may be a full-wave rectifier or a half-wave rectifier. At least one capacitor 38 is coupled across bus 34 to reduce the residual "ripple" and/or other time varying components of the DC electric power sourced from rectifier 32. Inverter 36 converts the DC electric power on bus 34 to the sinusoidal AC electric power output with the target frequency and voltage properties previously indicated. Inverter 36 is of a standard H-bridge configuration comprised of appropriate switches responsive to control system inputs to regulate the desired output properties. Such switches may be controllable insulated gate bipolar transistors (IGBTs), field effect transistors (FETs), gated thyristors, silicon-controlled rectifiers (SCRs), or different controllable switching devices as would occur to those skilled in the art. While the output of inverter 36 is depicted as a single-phase type, in other embodiments, a multiphase output, such as a three-phase type, can be provided.

Arrangement 40 senses the voltage and current of the AC electric power output from inverter 36 at predetermined intervals with sensors 42a and 42b, and provides corresponding output voltage and current signals to controller 50. While not shown to preserve clarity, a low pass filter may be utilized ahead of arrangement 50. Controller 50 is electrically coupled to generator 24, inverter 36, and arrangement 40. In one embodiment, controller 50 is also electrically coupled to an Engine Control Module (ECM) for engine 21. Controller 50 executes operating logic 52 that defines various control, management, and/or regulation functions. Logic 52 may be in the form of dedicated hardware, such as a hardwired state machine, programming instructions, and/or a different form as would occur to those skilled in the art. Controller 50 may be provided as a single component or a collection of operatively coupled components; and may be comprised of digital circuitry, analog circuitry, or a hybrid combination of both.

When of a multi-component form, controller 50 may have one or more components remotely located relative to the others. Controller 50 may include multiple processing units arranged to operate independently, in a pipeline processing arrangement, in a parallel processing arrangement, and/or such different arrangement as would occur to those skilled in the art. In one embodiment, controller 50 is a programmable microprocessing device of a solid-state, integrated circuit type that includes one or more processing units and memory. Controller 50 may include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, power supplies, memory devices, communication networks, and/or different circuitry or functional components as would occur to those skilled in the art to perform the desired operations.

Figure 2:
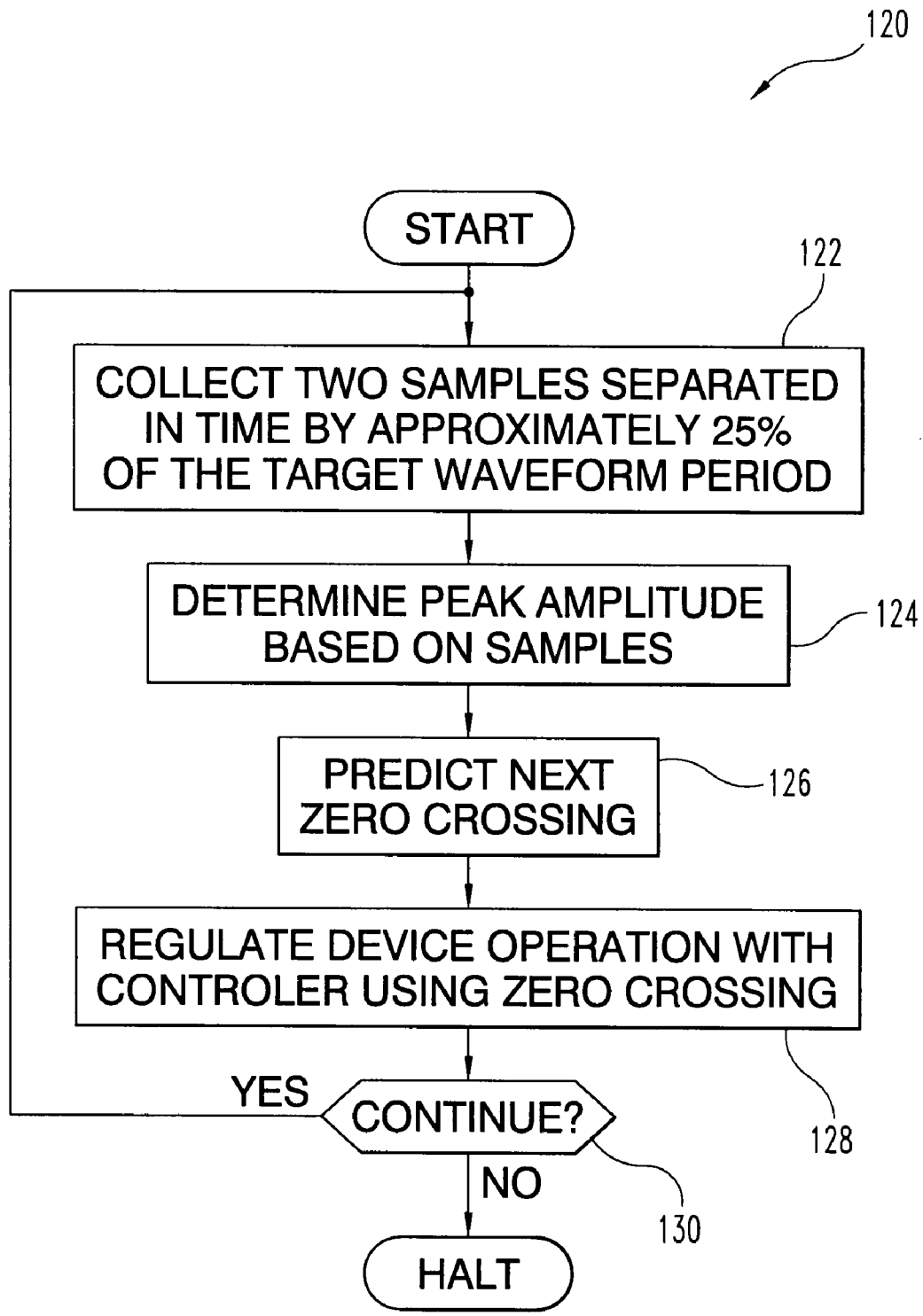
FIG. 2 is a flowchart of one procedure for operating the system of FIG. 1.
Figure 3:
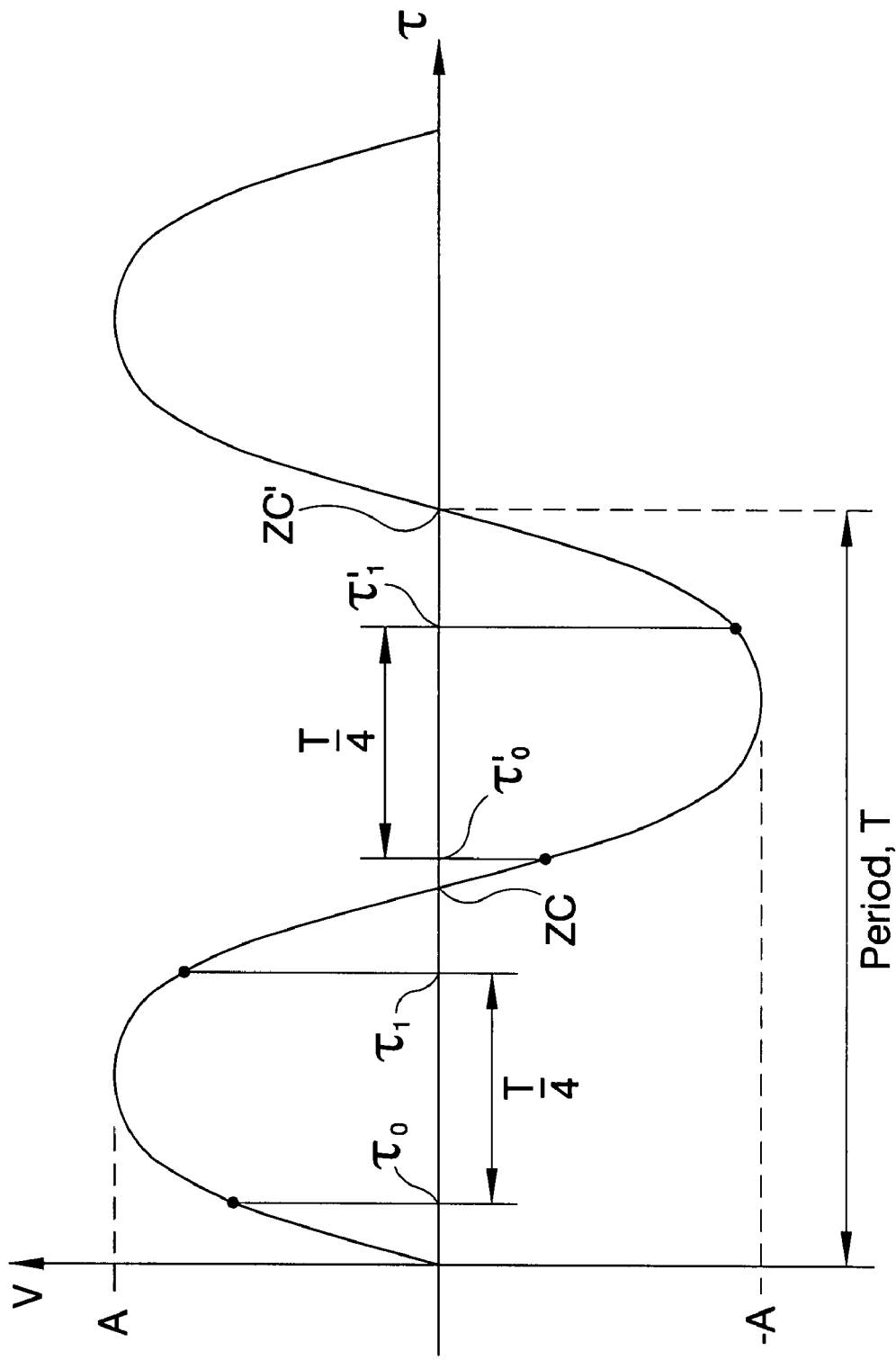
FIG. 3 is a graph illustrating an output sampling technique utilized in the procedure of FIG. 2.

Among its operations, controller 50 is responsive to signals from arrangement 40 to determine a zero crossing of the output waveform—that is where the waveform changes polarity. This zero crossing information is used by operating logic 52, as executed by controller 50, to regulate certain operational aspects of system 20. Referring additionally to the flowchart of FIG. 2 and the graphic view of an output waveform in FIG. 3, selected aspects of the operation of system 20 are further illustrated; where like reference numerals refer to like features previously described. More specifically, logic 52 of controller 50 implements a zero crossing detection procedure 120 as represented in the flowchart of FIG. 2. Procedure 120 includes operations 122, 124, 126, and 128, and conditional 130. Procedure 120 evaluates the sinusoidal voltage, V(t), of the AC electric power output from inverter 36, which can be represented by the following expression (1):

$$V(t) = A \sin(\omega t) \quad (1)$$

where: t represents time, A represents peak amplitude, and $\omega$ represents frequency in radians per second. As previously considered, the waveform frequency $\omega$ is known. Correspondingly, the waveform period, T, in seconds is represented by $T=1/f$; where $f=\omega/2\pi$. FIG. 3 illustrates the AC electric power output waveform where the waveform magnitude is plotted against the vertical axis in volts (V) and the horizontal axis represents time in seconds (t). The waveform has a period of T and crosses the horizontal axis at zero crossing point ZC and zero crossing point ZC'.

Procedure 120 begins with operation 122. In operation 122, voltage is measured at two different times $\tau_0$ and $\tau_1$, with arrangement 40 to provide two corresponding instantaneous voltage signals $V(\tau_0)$ and $V(\tau_1)$ using standard digital sampling techniques. The time interval between the samples at times is selected to be ¼ of the waveform period T. As a result, the sampled voltages can be represented as follows by expressions (2a) and (2b):

$$V(\tau_0) = A \sin(\omega \tau_0) \quad (2a)$$

$$V(\tau_1) = A \sin\left(\omega \tau_0 + \frac{\pi}{2}\right) \quad (2b)$$

It has been discovered that selection of this $\pi/2$ radians (T/4 in seconds) span of time results in a simplified approach to determining a predefined magnitude for a periodic waveform where the frequency $\omega$ (and correspondingly the period, T) are known.

In operation 124, these one quarter waveform voltage samples are used to determine the peak amplitude of the waveform voltage. Letting $M=(V(\tau_0))^2+(V(\tau_1))^2$, then according to the following expressions (3a) and (3b):

$$M = (A \sin(\omega \tau_0))^2 + (A \sin(\omega \tau_0 + \pi/2))^2 \quad (3a)$$

$$M = A^2 ((\sin(\omega \tau_0))^2 + (\sin(\omega \tau_0 + \pi/2))^2) \quad (3a)$$

and given the identities that:

$$\sin\left(\theta + \frac{\pi}{2}\right) = \cos(\theta) \text{ and } \sin(\theta)^2 + \cos(\theta)^2 = 1,$$

then $M=A^2$ so that $A=(M)^{1/2}$. It follows that the peak amplitude A may be determined by taking the square root of the sum of the squares of the measurements as set forth in expression (4):

$$A = \sqrt{V(\tau_0)^2 + V\left(\tau_0 + \frac{T}{4}\right)} \quad (4)$$

From this determination of the amplitude A, and the fact that $\omega$ is known, the next zero crossing of the waveform is determined in operation 126 from the sinusoidal phase, $\omega t_0$, based on the following expression (5) with A as determined in operation 124:

$$\omega \tau_0 = \sin^{-1}\left(\frac{V(\tau_0)}{A}\right) \quad (5)$$

Accordingly, relative to $\tau_0$ the time of each zero crossing coincides with each time the phase $\omega \tau_0$ is zero.

For example, based on FIG. 3, let the target frequency, f, be 60 Hertz (cycles/second), which corresponds to a period of $T=1/f=1/60\approx0.01666667$. In radians, the frequency, $\omega$ is $2\pi^*f=2\pi^*60=120\pi$ radians/second. Also, let $\tau_0=0.0016$ s (second) so that $\tau_1$ is $T/4+\tau_0$, which is given by: $\tau_1\approx((0.01666667/4)+0.0016)\approx0.00583333$ s. Given further that $V(\tau_0)$ and $V(\tau_1)$ are measured as 110 and 152 volts, respectively, then $A=(110^2+152^2)^{1/2}\approx187.62$ volts. Accordingly from expression (5), $\sin^{-1}(110/187.62)\approx0.62$ radian$\approx36$ degree phase at time $\tau_0$, which indicates the next zero crossing ZC to be $(((180-36 \text{ degrees})/180)^*T/2)\approx((144/180)^*(0.01666667/2))\approx0.006666668$ s. As a check, the sum of this time to zero crossing and $\tau_0=0.0016$ s should approximate $T/2\approx0.006666668+0.0016\approx0.0083\approx(T/2=1/120=1/2^*(1/60))$ in seconds (s). Similarly, samples at $\tau_0'$ and $\tau_1'$ as shown in FIG. 3 and separated in time by T/4 can be used to determine zero crossing ZC'. It should be appreciated that the mathematical operations performed herein can be calculated in real time and/or determined from one or more look-up tables or schedules, as desired; and/or the degree of accuracy can vary with the accuracy of the samples magnitude and timing, as desired.

In operation 128, controller 50 uses the zero crossing result to regulate operation of system 20. In one embodiment, controller 50 determines pulse width modulated (PWM) control signals output to inverter 36 at least in part based on the zero crossing point to maintain the target frequency and voltage in response to a significant change in load 26 that may cause a transient deviation in peak amplitude A and/or frequency f. Alternatively or additionally, controller 50 sends control signals to an ECM to modulate operation of engine 21 in response to the zero crossing determination.

In conditional 130, the determination of whether to repeat procedure 120 is tested. If "YES," the procedure 120 begins again at operation 122 and the process is repeated for new voltage measurements. If "NO," the procedure 120 halts. It should be appreciated that procedure 120 can be executed on a scheduled, periodic or aperiodic basis, on a schedule contingent on one or more conditions, and/or as an interrupt routine, just to name a few examples.

Many different embodiments of the present application are envisioned. For example, in other applications the AC electric power output may be provided from a generator or other source without an intervening converter, rectifier, DC bus, inverter, or the like. Furthermore, this technique can be applied in the regulation of other types of generators, such as a nonvariable variety. Alternatively or additionally, the prime mover may be a device other than an internal combustion engine, such as a wind, steam, or hydraulic turbine, or such different source as would occur to those skilled in the art. In still another arrangement, electric current is measured instead of voltage to provide a desired control signal indicative of zero-crossing of the current waveform. In yet other embodiments, the techniques of the present invention are used to determine a predefined magnitude other than zero.

In another example, one embodiment of the present application includes: operating an electric power generating device to provide an AC electricity output to a load at a target frequency, the device including an electric power generator; sampling the AC electricity output at a first time to determine a first output magnitude and at a second time to determine a second output magnitude, the second time being a target duration later than the first time, and the target duration being less than a waveform period for the target frequency; determining a further magnitude of the AC electricity output from the first magnitude, the second magnitude, and the desired frequency; and regulating the electric power generating device in accordance with the further magnitude of the AC electricity output. In one form, this further magnitude is a zero crossing point in time for the waveform.

Still another example includes: operating an electric power generating device to provide an AC electricity output to a load at a target frequency, the device including an electric power generator; selecting a span of time less than one half of a waveform period for the target frequency; during the span of time, making a first magnitude measurement of the AC electricity output at a first time and second magnitude measurement of the AC electricity output at a second time after the first time; determining a zero crossing of the AC electricity output from the first magnitude measurement, the second magnitude measurement, and the target frequency; and regulating the electric power generating device in accordance with the zero crossing of the AC electricity output. In one form, the zero-crossing is determined with no more than the two measurements during the span of time.

A different example is directed to an electric power generating device that provides an AC electricity output to a load at a target frequency. This device includes: an electric power generator, means for selecting a span of time less than one have a waveform period for the target frequency, means for making a first magnitude measurement of the AC electricity output at a first time and second magnitude measurement of the AC electricity output at a second time after the first time during the span of time, and means for determining a zero crossing of the AC electricity output from the first magnitude measurement, the second magnitude measurement, and the target frequency. In one form, the device further includes means for regulating the electric power generating device in accordance with the zero crossing of the AC electricity output.

A further example is directed to a system comprising an electric power generation device to provide an AC electricity output to a load at a target frequency. This device includes: means for generating electricity, means for sampling the AC electricity output at a first time to determine a first output magnitude and at a second time to determine a second output magnitude, the second time being a target duration later than the first time, and the target duration being less than a waveform period for the target frequency; means for determining a zero crossing of the AC electricity output from the first magnitude, the second magnitude, and the desired frequency; and means for regulating the electric power generating device in accordance with the zero crossing of the AC electricity output.

Yet another example includes: operating an electric power generating device to provide an AC electric power output to a load at a target frequency, the device including an electric power generator; sensing a first magnitude representative of the AC electric power output at a first time and a second magnitude representative of the AC electric power output at a second time, the second time being a target duration later than the first time, and the target duration being less than a waveform period for the target frequency; calculating the peak amplitude of the AC electric power output from the first magnitude, the second magnitude, and the target duration; predicting a waveform characteristic as a function of the peak amplitude and the target frequency; and controlling the electric power generating device in accordance with a control signal corresponding to the waveform characteristic.

Another example relates to a system comprising an electric power generating device to provide an AC electric power output to a load at a target frequency. The device includes an electric power generator. The devices also includes: means for sensing a first magnitude representative of the AC electric power output at a first time and a second magnitude representative of the AC electric power output at a second time, the second time being a target duration later than the first time, and the target duration being less than a waveform period for the target frequency; means for calculating the peak amplitude of the AC electric power output from the first magnitude, the second magnitude, and the target duration; means for predicting a waveform characteristic as a function of the peak amplitude and the target frequency; and means for controlling the electric power generating device in accordance with a control signal corresponding to the waveform characteristic.

In another example, a system, comprises an electric power generation device structured to provide an AC electric power output at a target frequency. This device includes: an electric power generator; a sensing arrangement structured to provide samples corresponding to magnitude of the AC electric power output; a controller including operational logic responsive to the sensing arrangement to calculate a peak amplitude as a function of a waveform period corresponding to the target frequency and two of the samples separated in time by a target duration of 20 to 30 percent of the waveform period. The operating logic is also structured to determine a zero crossing of the output from the peak amplitude and the target frequency and control operation of the device in accordance with the zero crossing.

In a further example, a system comprises an electric power generation device to provide an AC electric power output at a target frequency. This device includes: an electric power generator; means for sampling the AC electric power output; and means for determining a zero crossing of the AC electric power output as a function to two of the samples separated in time by approximately one quarter of the waveform period corresponding to the target frequency.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. A method, comprising:
   operating an electric power generating device to provide an AC electricity output to a load at a target frequency, the device including an electric power generator;
   sampling the AC electricity output at a first time to determine a first output magnitude and at a second time to determine a second output magnitude, the second time being a target duration later than the first time, and the target duration being less than a one half a waveform period for the target frequency;
   determining a zero crossing of the AC electricity output after the first time from the first magnitude, the second magnitude, and the target frequency; and
   regulating the electric power generating device in accordance with the zero crossing of the AC electricity output.

2. The method of claim 1, wherein the target duration is approximately one quarter of the waveform period and the determining of the zero crossing includes:
   calculating a peak amplitude from the first magnitude and the second magnitude; and
   predicting the zero crossing based on the peak amplitude and the target frequency.

3. The method of claim 1, wherein the electric power generating device includes a controller and an inverter, the determining of the zero crossing includes calculating the zero crossing with the controller, and the regulating of the electric power generating device includes controlling the inverter with the controller.

4. The method of claim 3, wherein the controlling of the inverter targets a sinusoidal waveform for the AC electricity output.

5. The method of claim 3, wherein the generator is of a variable speed type, the device includes a rectifier coupled to the generator and the rectifier is coupled to the inverter by a direct current bus; and further comprising providing rotational mechanical power to the generator with an internal combustion engine.

6. The method of claim 1, wherein the AC electricity output is at least approximately sinusoidal and the target duration is between 20% and 30% of the waveform period.

7. A method, comprising:
   operating an electric power generating device to provide an AC electric power output to a load at a target frequency, the device including an electric power generator;
   sensing a first magnitude representative of the AC electric power output at a first time and a second magnitude representative of the AC electric power output at a second time, the second time being a target duration later than the first time, and the target duration being less than a waveform period for the target frequency;
   determining the peak amplitude of the AC electric power output from the first magnitude, the second magnitude, and the target duration;
   predicting a waveform characteristic as a function of the peak amplitude and the target frequency; and
   controlling the electric power generating device in accordance with a control signal corresponding to the waveform characteristic.

8. The method of claim 7, which includes:
   operating the electric power generator at different frequencies;
   providing the AC electric power output with an inverter included in the device; and
   adjusting operation of the inverter in accordance with the control signal.

9. The method of claim 7, wherein the waveform characteristic is representative of a zero crossing of the AC electric power output in a sinusoidal form and the target duration is between 20% and 30% of the waveform period.

10. The method of claim 7, wherein target duration is approximately 25% of the waveform period, and the sensing of the first magnitude and the second magnitude includes sampling voltage corresponding to the AC electric power output.

11. The method of claim 7, which includes:
    providing mechanical power to the generator with an internal combustion engine;
    providing DC electricity to a DC bus by rectifying electricity output by the generator;
    providing the DC electricity to an inverter; and
    providing the AC electric power output from the inverter.

12. The method of claim 7, which includes:
    repeating the sensing, the determining, and the predicting on a periodic basis; and
    updating the control signal on in accordance with the repeating.

13. The method of claim 7, wherein the AC electric power output is sinusoidal, the waveform characteristic changes in response to a change in the load, and the controlling of the device includes adjusting the control signal in accordance with the change in load to regulate the AC electric power output to a target frequency and power factor.

14. The method of claim 7, wherein the function to calculate the peak amplitude corresponds to a square root of the sum of: the first magnitude squared and the second magnitude squared.

15. A system, comprising: an electric power generation device structured to provide an AC electric power output at a target frequency, the device including:
    an electric power generator;

a sensing arrangement structured to provide samples corresponding to magnitude of the AC electric power output;

a controller including operational logic responsive to the sensing arrangement to calculate a peak amplitude as a function of a waveform period corresponding to the target frequency and two of the samples separated in time by a target duration of 20 to 30 percent of the waveform period and determine a zero crossing of the output from the peak amplitude and the target frequency, the operating logic being structured to control operation of the device in accordance with the zero crossing.

16. The system of claim 15, wherein the device includes:
means for converting variable frequency electricity output by the generator to DC electricity; and
means for inverting the DC electricity to provide the AC electric power at the target frequency.

17. The system of claim 15, wherein the device includes:
a rectifier coupled to the generator to convert variable frequency electricity from the generator to DC electricity;
a DC bus coupled to the rectifier to receive the DC electricity; and
an inverter coupled to the DC bus to convert the DC electricity to the AC electric power output regulated to the target frequency.

18. The system of claim 15, wherein the sampling arrangement includes means for periodically sampling the output to define the target duration to be approximately 25% of the waveform period.

19. The system of claim 15, further comprising an internal combustion engine providing mechanical power to operate the generator.

20. A method, comprising:
operating an electric power generating device to provide an AC electricity output to a load at a target frequency, the device including an electric power generator;
selecting a span of time less than one half of a waveform period for the target frequency;
during the span of time, making a first magnitude measurement of the AC electricity output at a first time and second magnitude measurement of the AC electricity output at a second time after the first time;
determining a zero crossing of the AC electricity output from the first magnitude measurement, the second magnitude measurement, and the target frequency; and
regulating the electric power generating device in accordance with the zero crossing of the AC electricity output.

21. The method of claim 20, wherein the duration is approximately one quarter of the waveform period and the determining of the zero crossing includes:
calculating a peak amplitude from the first magnitude measurement and the second magnitude measurement; and
ascertaining the zero crossing based on the peak amplitude and the target frequency.

22. The method of claim 20, wherein the electric power generating device includes a controller and an inverter, the determining of the zero crossing includes calculating the zero crossing with the controller, and the regulating of the electric power generating device includes controlling the inverter with the controller.

23. The method of claim 20, wherein the controlling of the inverter targets a sinusoidal waveform for the AC electricity output.

24. The method of claim 23, wherein the generator is of a variable speed type, the device includes a rectifier coupled to the generator and the rectifier is coupled to the inverter by a direct current bus; and further comprising providing rotational mechanical power to the generator with an internal combustion engine.

25. The method of claim 23, wherein the determining of the zero crossing is performed with no more magnitude measurements than the first magnitude measurement and the second magnitude measurement during the span of time.

26. The method of claim 25, wherein the span of time is about one fourth of the waveform period and the output is at least approximately a sinusoidal waveform.

* * * * *